United States Patent [19]
Horstmann

[11] Patent Number: 6,009,525
[45] Date of Patent: Dec. 28, 1999

[54] MULTI-TIER ELECTRONIC SOFTWARE DISTRIBUTION

[75] Inventor: Cay S. Horstmann, Cupertino, Calif.

[73] Assignee: Preview Systems, Inc., Cupertino, Calif.

[21] Appl. No.: 08/921,394

[22] Filed: Aug. 29, 1997

[51] Int. Cl.$^6$ ..................................................... H04L 9/00
[52] U.S. Cl. ............................................. 713/200; 380/4
[58] Field of Search .............................. 395/186, 187.01, 395/188, 600, 700, 726; 380/1.4, 25, 21–24, 46, 49, 42–45, 55; 379/93.12, 91.02; 364/286.4, 286.5, 286.6; 713/200, 201, 202

[56] References Cited

U.S. PATENT DOCUMENTS

| | | | |
|---|---|---|---|
| 4,864,494 | 9/1989 | Kobus, Jr. ................................. | 364/200 |
| 4,953,209 | 8/1990 | Ryder, Sr. et al. ........................ | 380/23 |
| 5,023,907 | 6/1991 | Johnson et al. ............................. | 380/4 |
| 5,138,712 | 8/1992 | Corbin ..................................... | 395/700 |
| 5,142,578 | 8/1992 | Matyas et al. ............................. | 380/21 |
| 5,182,770 | 1/1993 | Medveczky et al. ........................ | 380/4 |
| 5,341,429 | 8/1994 | Stringer et al. ............................ | 380/23 |
| 5,509,070 | 4/1996 | Schull ........................................ | 380/4 |
| 5,530,752 | 6/1996 | Rubin ........................................ | 380/4 |
| 5,594,904 | 1/1997 | Linnermark et al. .................... | 395/704 |
| 5,628,015 | 5/1997 | Singh ...................................... | 395/186 |
| 5,636,277 | 6/1997 | Nagahama ................................ | 380/4 |
| 5,642,417 | 6/1997 | Stringer ...................................... | 380/4 |
| 5,666,411 | 9/1997 | McCarty ..................................... | 380/4 |
| 5,729,594 | 3/1998 | Klingman ............................. | 379/93.12 |
| 5,745,569 | 4/1998 | Moskowitz et al. ......................... | 380/4 |
| 5,758,069 | 5/1998 | Olsen ................................. | 395/187.01 |
| 5,790,664 | 8/1998 | Coley et al. ................................ | 380/4 |
| 5,864,620 | 1/1999 | Pettitt ........................................ | 380/4 |

OTHER PUBLICATIONS

IAC New Prod. Annou., "IBM InfoMarket Services", IAC New Prod. Annou. (Dialog file 621), 1–3, Oct., 1995.

*Primary Examiner*—Ly V. Hua
*Assistant Examiner*—Nadeem Iqbal
*Attorney, Agent, or Firm*—Burns, Doane, Swecker & Mathis LLP

[57] ABSTRACT

Methods of electronic software distribution are provided in which software products may be wrapped by their publishers in a straightforward, secure manner, but in such a way as to allow for the addition of information by downstream distribution channel partners, e.g., distributors and merchants (resellers). Distribution policies, or business rules, governing the distribution process may be fixed by the software publisher or may be left to the discretion of channel partners. The software product itself, however, is secured against tampering or inadvertent infection by a virus. A tool facilitates the foregoing incremental wrapping process without requiring sophistication in computer technology on the part of channel partners. The publisher may use a conventional setup tool of the publisher's choice to prepare a setup file set for distribution. That is, the wrapping tool need not influence the publisher's choice of setup tools.

10 Claims, 5 Drawing Sheets

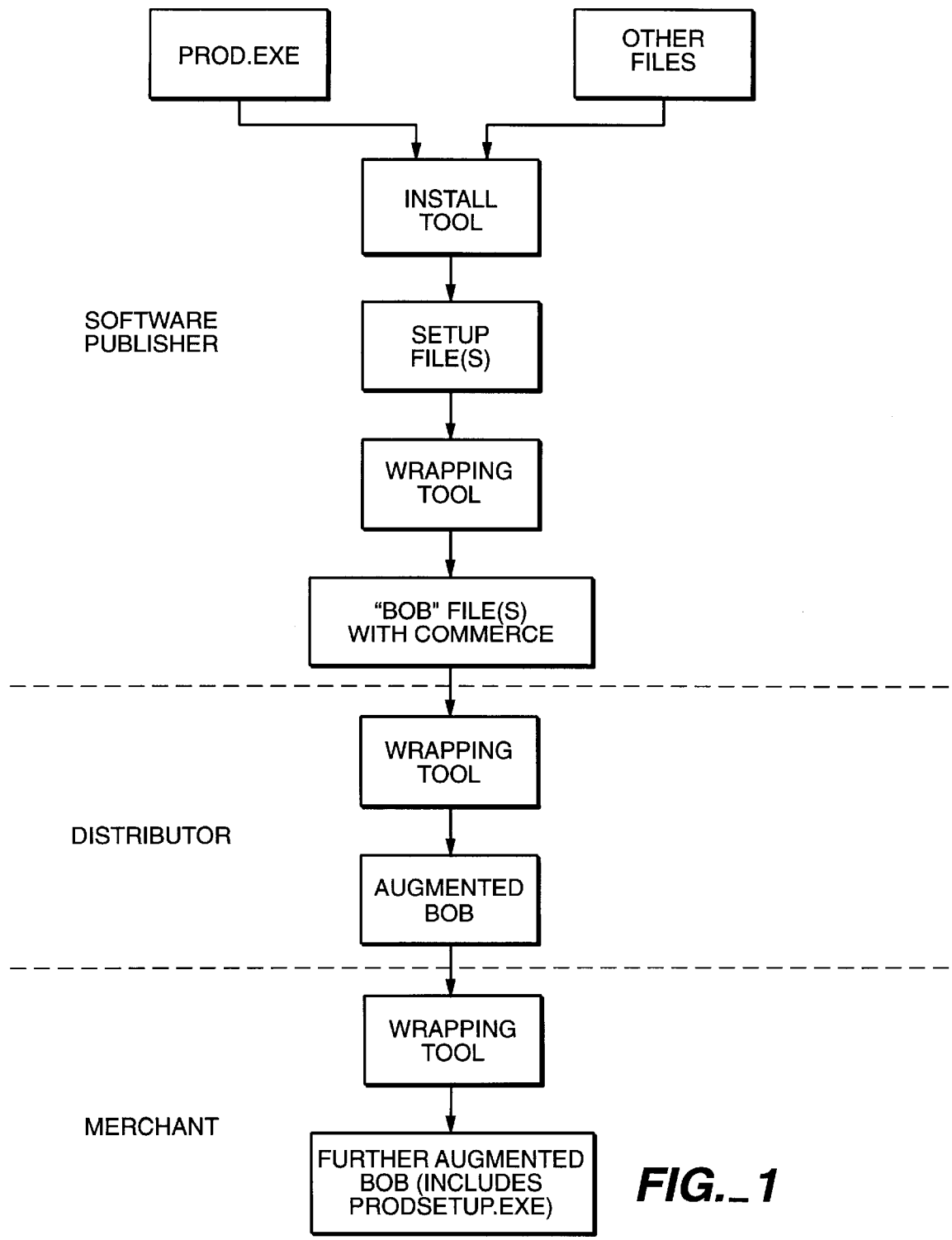
FIG._1

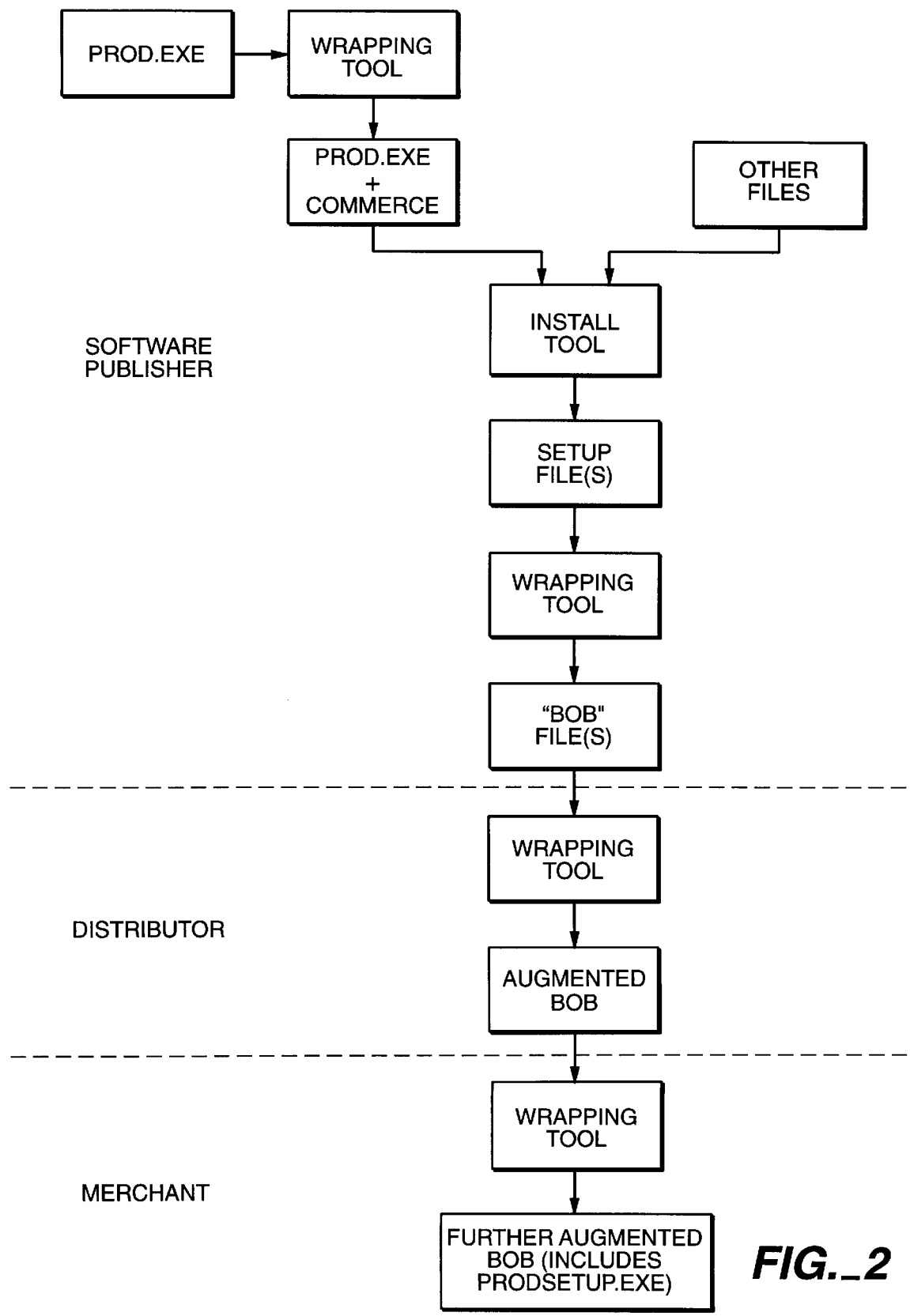
FIG._2

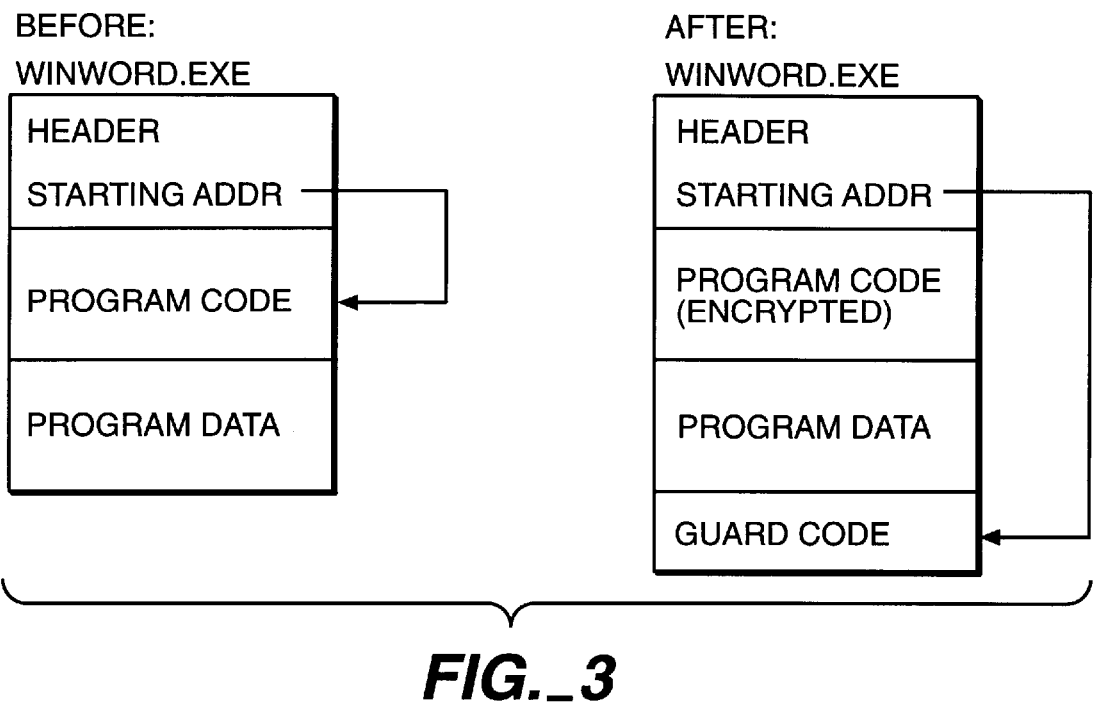
FIG._3
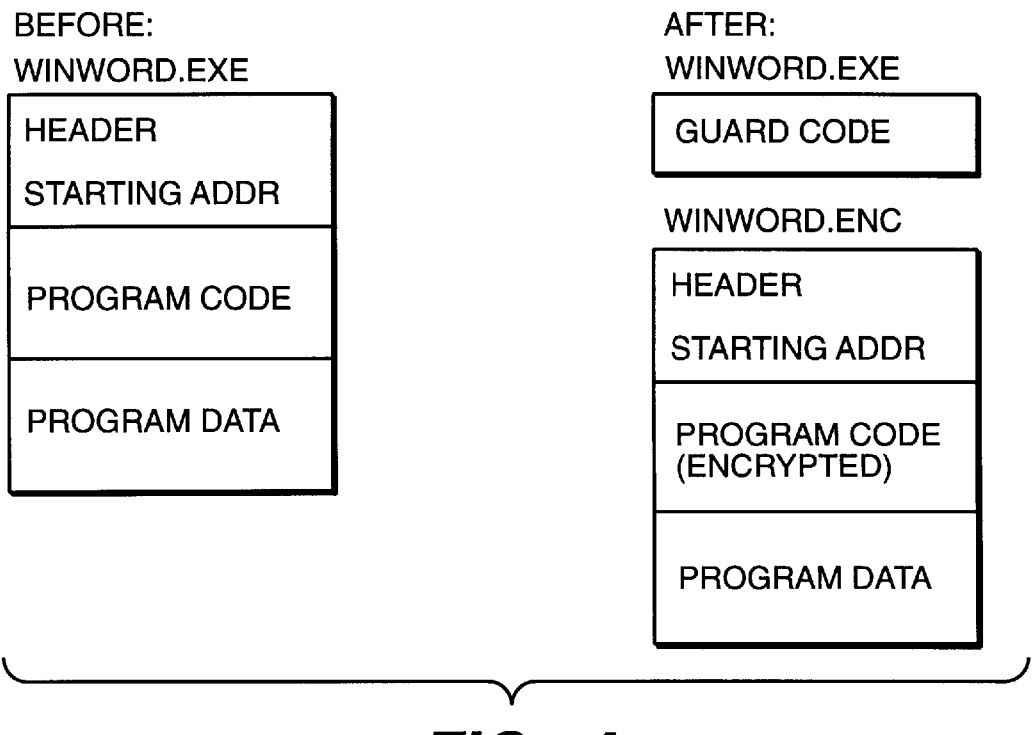
FIG._4

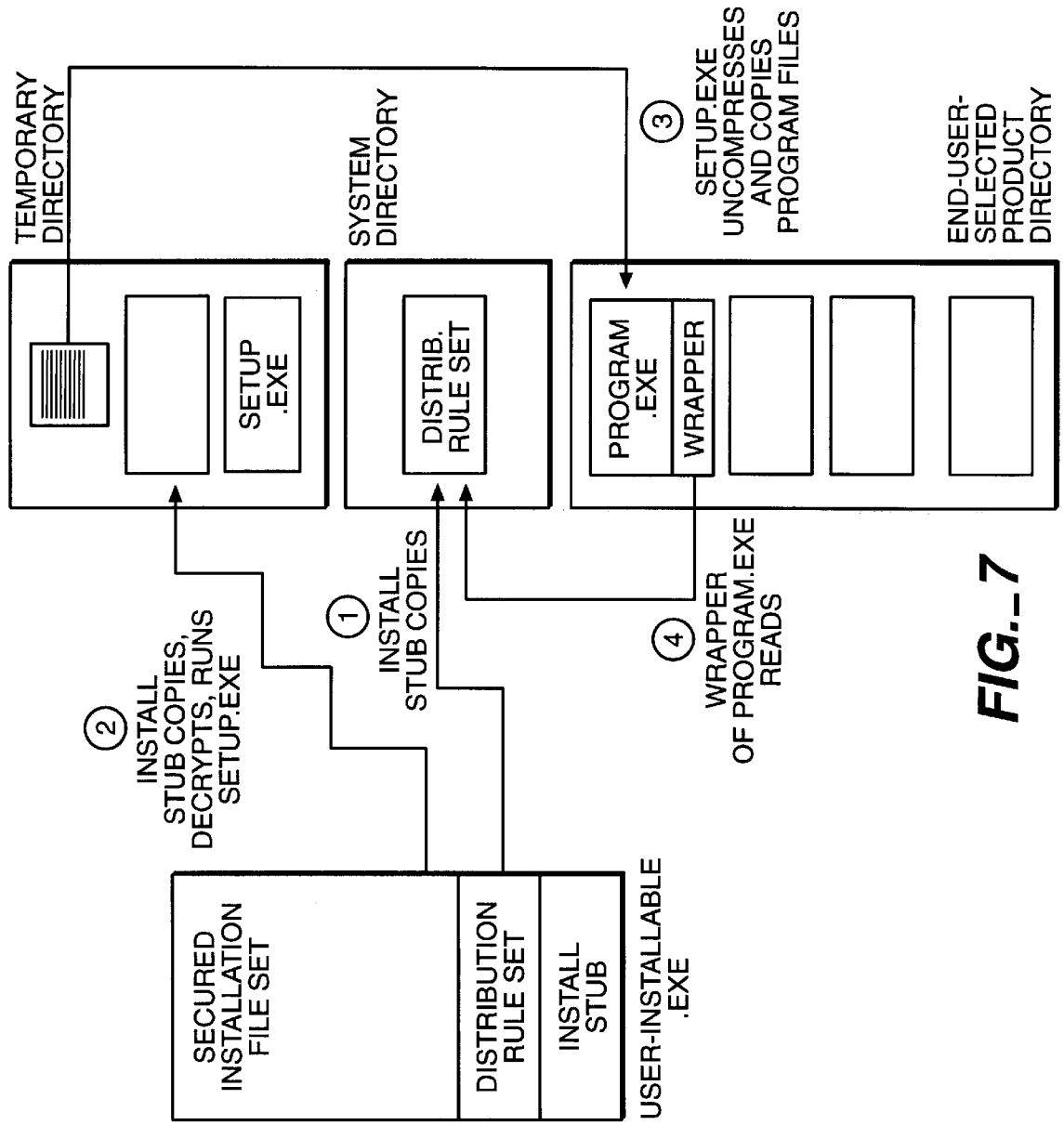
FIG._7
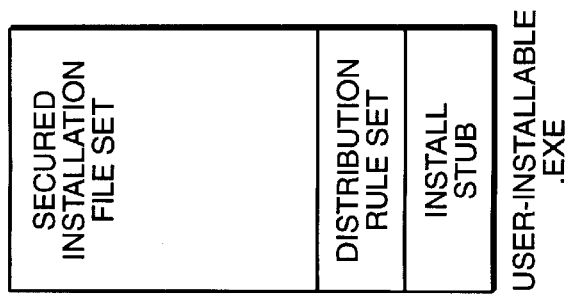
FIG._5

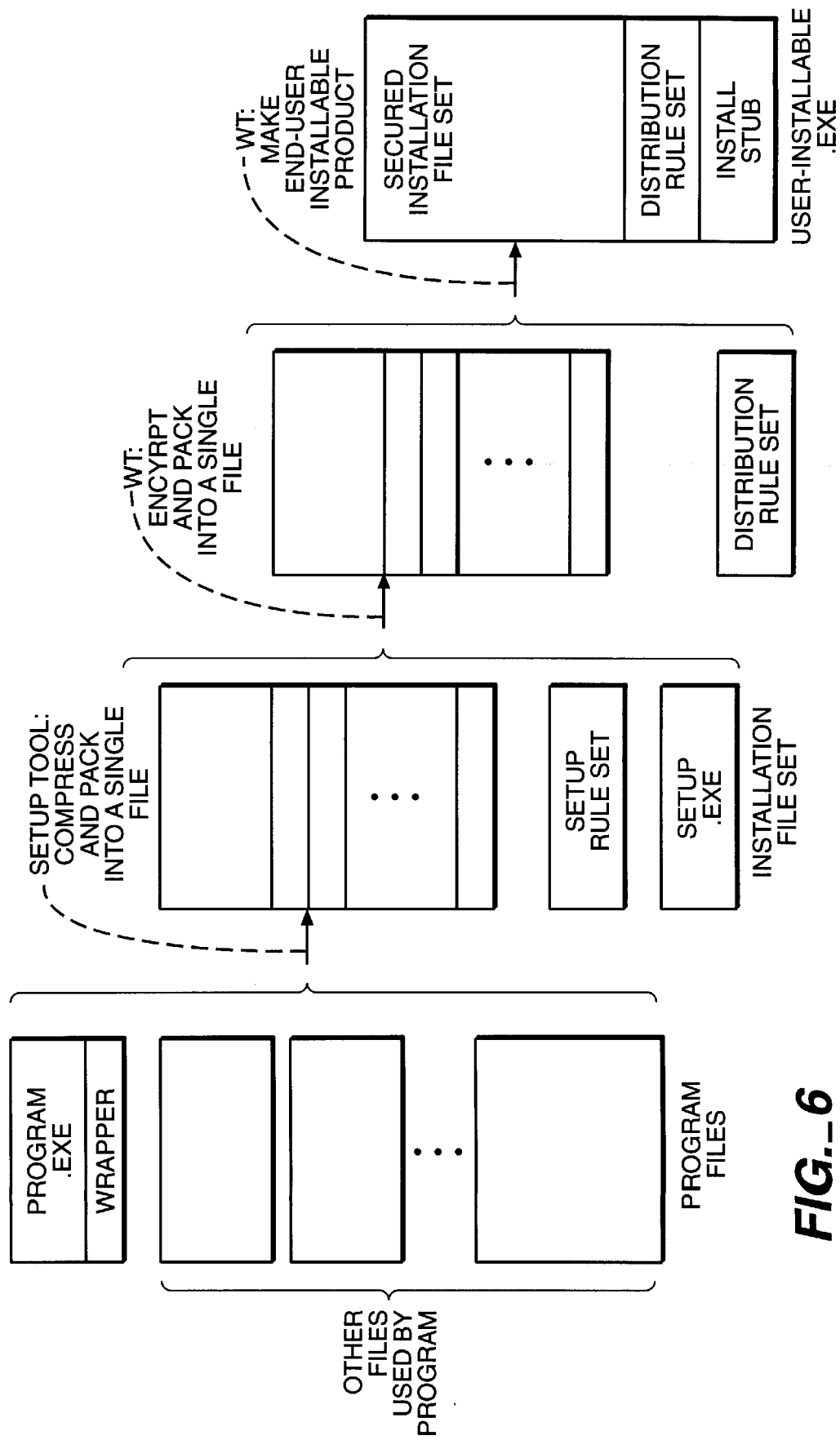
FIG._6

MULTI-TIER ELECTRONIC SOFTWARE DISTRIBUTION

BACKGROUND OF THE INVENTION

1. Field of the Invention

The present invention relates to electronic software distribution (ESD).

2. State of the Art

Conventionally, software has been distributed in shrink-wrap form. That is, disk copies of a piece of software have been packaged and shrinkwrapped, usually together with user's manuals. Boxes of shrinkwrapped software are then moved through distribution channels, with payment being made in the usual commercial fashion.

With the widespread use of CD ROMs, expensive manuals are increasingly being dispensed with in favor of on-line manuals, i.e., manuals stored on CD ROM. The software and its documentation have been merged together. Furthermore, with the proliferation of inexpensive, high capacity hard drives, either on a stand-alone computer or a network server, and widespread Internet access (through increasingly high speed "pipes"), it is now possible to distribute software electronically by allowing customers to download the software from a server.

So long as the owner of the software (i.e., the software publisher) retains possession and control of the software being distributed, things go relatively smoothly. The threat of unauthorized copying still remains, but is not especially aggravated as compared to the same threat in the case of conventional software distribution.

Software publishers, however, often do not wish to open and maintain a "storefront" for electronic software distribution, and often do not have sufficient market reach or presence to effectively distribute the software that they have produced. A software publisher may therefore wish to "team up" with one or more "channel partners" in order to effectively carry out electronic software distribution. In such an arrangement, the software publisher puts a software product within the possession and control of one or more (and possibly hundreds of) channel partners. Safeguarding the software (e.g., to avoid contamination by viruses) becomes an issue of vital importance, as does reporting. Inventorying software in electronic form is much more susceptible to duplicity and fraud than inventorying boxes of software.

To facilitate electronic software distribution, clearinghouses have emerged. A clearinghouse functions as a kind of escrow agent for the software publisher and channel partners. Software products for electronic distribution are locked (using encryption). The clearinghouse holds unlock keys for software products and reports to the other parties whenever an unlock key is requested by and released to a customer. The clearinghouse typically also receives payment from the customer and credits the account of the appropriate channel partner.

Electronic software distribution may follow a buy-before-you-try (Buy/Try) model or a try-before-you-buy (Try/Buy) model. Buy/Try is the conventional model used in packaged software distribution: the customer must first buy the package before the customer is able to use it. In the Try/Buy model, the customer is allowed to try the software for a period of time before being required to either buy the software or discontinue use of the software. Try/Buy can operate to the advantage of both the customer (allowing the customer to become acquainted with the product before deciding whether to buy it) and the software publisher (affording more customers an opportunity to try and ultimately buy the product). Try/Buy, however, does introduce further complexity into electronic software distribution. The Software Publishers Association has issued guidelines for Try/Buy electronic software distribution, available at the Web page http://www.spa.org.

Wrapper technology providers are responsible for providing secure encryption technology for Buy/Try and Try/Buy purchases. In the case of Try/Buy, the user downloads and installs the product. The product is altered in such a way that the potential customer can use the product a limited number of times, a limited amount of time, or is functionally "crippled" in some way. At the end of the trial period, the user either purchases the product or deletes the "wrapped" version. If the product is purchased, the clearinghouse provides the customer a key that "breaks the shrinkwrap" and permanently installs the product.

Existing wrapping technologies for electronic software distribution suffer from significant drawbacks. Wrapping is typically performed in a laboratory-like environment in a semi-custom (or ad hoc) manner by companies having special expertise. The process may have a turn-around time of several days to several weeks, depending on the complexities that arise in the wrapping of a particular product. Furthermore, wrapping typically follows a "wrap once" in which no further information may be added to the wrapped product. Such a model does not lend itself to channelization in cooperation with multiple (possibly very numerous) channel partners. Different wrappings would have to be carried out for different channel partners. Also, separate processes and tools have typically been required for Buy/Try wrapping and Try/Buy wrapping. There is therefore a need for electronic software distribution methods that overcome the foregoing disadvantages.

SUMMARY OF THE INVENTION

The present invention, generally speaking, provides for methods of electronic software distribution in which software products may be wrapped by their publishers in a straightforward, secure manner, but in such a way as to allow for the addition of information by downstream distribution channel partners, e.g., distributors and merchants (resellers). Distribution policies, or business rules, governing the distribution process may be fixed by the software publisher or may be left to the discretion of channel partners. The software product itself, however, is secured against tampering or inadvertent infection by viruses. A tool facilitates the foregoing incremental wrapping process without requiring sophistication in computer technology on the part of channel partners.

BRIEF DESCRIPTION OF THE DRAWING

The present invention may be further understood from the following description in conjunction with the appended drawing. In the drawing:

FIG. 1 is a flow diagram of a multi-tier distribution process used to produce a Buy/Try customer downloadable file;

FIG. 2 is a flow diagram of a multi-tier distribution process used to produce a Try/Buy customer downloadable file;

FIG. 3 is a diagram of a first wrapper mechanism;

FIG. 4 is a diagram of a second wrapper mechanism;

FIG. 5 is a diagram representing an end-user installable product produced by the process of FIG. 2;

FIG. 6 is an alternative representation of the process of FIG. 2, useful for understanding the secondary setup process; and FIG. 7 is a diagram of the secondary setup process.

DETAILED DESCRIPTION OF THE PREFERRED EMBODIMENTS

The present invention may be embodied in a "wrapping" software toolkit for use in electronic software distribution. (The terms "toolkit" and "tool" are used interchangeably herein.) Desirably, a single such tool should:

1. Allow software publishers to add electronic commerce and, optionally, Try/Buy capabilities to software products;

2. Allow software publishers to secure the software product against contamination or tampering;

3. Allow software publishers to set distribution policies or to allow distribution policies to be set further down the distribution chain;

4. Allow one or more channel partners within one or more distribution tiers to add identifying information and, optionally, to set distribution policies; and 5. Prevent interference of channel partners with one another.

The manner in which these objectives may be obtained will be described in detail. Further details regarding software protection and software self-modification, respectively, may be found in U.S. application Ser. Nos. 08/921272, and 08/921402 (Atty. Dkt. Nos. 031994-003 and 031994-007), filed on even date herewith and incorporated herein by reference.

In the conventional software publishing process, the software publisher produces either a setup file set (in the case of floppy or CD distribution) or a single "self-extracting" setup file (in the case of on-line or electronic distribution). The setup file may be produced using a tool such as Install Shield™. To enable electronic distribution in accordance with the foregoing objectives, modifications are required to the executable file, the setup file, or possibly both, depending on the distribution model (Try/Buy, Buy/Try, etc.).

Referring first to FIG. 1, the modifications for Buy/Try will first be described. Assume an executable program PROG.EXE. Using a conventional tool, a setup file (for customer installation) is produced from the executable and other ancillary files. The software publisher performs this step in the normal way using the same tool as in conventional software distribution. No modifications are required. The resulting setup file is typically compressed and may also be, in large part, encrypted.

The software publisher then uses the present wrapper tool, modifying the setup file to produce a downloadable binary file (a "bag of bits," or BOB). In an exemplary embodiment, the modifications performed during this step are threefold. First, the setup file is wrapped (encrypted) so that it cannot be tampered with by other channel partners. Second, a distribution rule set is added external to the setup file. The distribution rule set contains, initially, instructions by the publisher. Adding the distribution rule set external to the setup file allows it to be edited by other channel partners. The distribution rule set is not part of the setup file that the publisher puts together and then wraps securely. Third, code is added that provides electronic commerce capabilities. The electronic commerce portion of the code provides for electronic purchase of the software on-line using a credit card or some other method of electronic payment such as electronic cash or a pre-approved corporate credit line. Since the software may be sold by any one of a multitude of parties within a distribution network, this code also refers to the distribution rule set to determine to whom payment is to be made.

The foregoing arrangement results from the requirement that the channel partners be able to make changes to the distribution rule set. More particularly, a tool cannot make changes to a file that is included in the setup file or file set, because the setup file set can be created by any of a number of different tools that use different compression and packing methods to store the application files. Therefore the wrapping tool must manage the distribution rule set separately from the setup file set.

When the software publisher has finished with the BOB, the BOB may then be passed along to a channel partner and, optionally, from channel partner to channel partner through any number of tiers of the multi-tier distribution network. Each channel partner uses a tier-specific privilege file (which is password protected) to add to the distribution rule set information within its privilege level. The distribution rule set is then resecured. Preferably, the wrapping tool automatically handles the unencryption/reencryption of the distribution rule set in a manner completely transparent to the channel partners. In an exemplary embodiment, the privilege structure is such as to prevent interference of channel partners with one another. For example, once the distribution rule set has been "touched" by a first channel partner of a given tier, subsequent channel partners within that same tier are not allowed access.

At each stage of the distribution process, the publisher and the publisher's channel partners add information to the distribution rule set as shown in Table 1.

TABLE 1

| Party | Inputs to Distribution rule Set |
|---|---|
| Tool Vendor | Secured password structure |
| Publisher | Publisher ID |
|  | Product identifier |
|  | End User License Agreement (EULA) |
| Distributor | Distributor ID |
|  | Clearinghouse key (for confidentiality between customer and clearinghouse) |
|  | Clearinghouse comm. parameters |
|  | Product unlock verification key |
| Merchant | Merchant ID |
|  | Product price |
|  | Merchant's clearinghouse account |

The distribution rule set contains a secure password data structure administered by the tool vendor. At each stage, the publisher, distributor and merchant input their respective IDs into the license file. The distributor, in addition to its ID, inputs clearinghouse information. The merchant, in addition to its ID, inputs the product price and the merchant's clearinghouse account number. The inputs of the publisher may include product identification and a EULA agreement.

Hence, to summarize the process of producing a Buy/Try customer downloadable file as illustrated in FIG. 1, the software publisher downloads the BOB to a distributor. The distributor uses the wrapping tool which decrypts the distribution rule set and allows the distributor to add the appropriate information to the distribution rule set (which is then re-encrypted) and downloads the BOB to a merchant. The merchant likewise adds appropriate information to the distribution rule set. The resulting file is a securely wrapped end-user installable package.

In Buy/Try distribution, to break the wrapper, a key is required which is typically delivered via the internet, telephone, etc.

Referring now to FIG. 2, the modifications required for Try/Buy (the advantages of which have been described previously) will be described. Assume the same executable program PROG.EXE. Using the same wrapper tool WT, the executable is "wrapped" by adding code that provides both Try/Buy and electronic commerce capabilities. The Try/Buy portion of the code allows or disallows execution of the program in accordance with trial policies (e.g., 30 day trial) stored in a license file, described hereinafter. The electronic commerce portion of the code is as previously described.

The "wrapping" process of augmenting an executable with code for electronic commerce and Try/Buy is known per se in the art and may be accomplished in a conventional manner. Wrapping of the program executable may be accomplished by "code injection" or by other alternative mechanisms. Referring to FIG. 3, in the code injection approach, wrapping is achieved by: 1) encrypting the program code; 2) adding guard code to the program executable; and 3) changing the starting address pointer within the application header to point to, instead of beginning of the program code, the beginning of the guard code. Referring to FIG. 4, in an alternative approach, the program code is encrypted and executable guard code is provided apart from the original executable. A program loader (not shown) starts out by executing the guard code that tests whether the user may proceed. It then decrypts and loads the original program. The chief difference between the two methods is that, in the second method, the guard code is in a separate file, rather than attached to the end of the executable.

Referring again to FIG. 2, assuming that the executable has been injected, for example, then, using a conventional tool, a setup file (for customer installation) is produced from the injected executable and other ancillary files. Again, the software publisher performs this step in the normal way using the same tool as in conventional software distribution. No modifications are required. The resulting setup file is typically compressed and may also be, in large part, encrypted.

The software publisher then uses the present wrapper tool a further time, modifying the setup file to produce a downloadable binary file, or BOB. In an exemplary embodiment, the modifications performed during this step are threefold. First, the setup file is wrapped (encrypted) so that it cannot be tampered with by other channel partners. Second, a distribution rule set is added external to the setup file as described previously. Third, the setup file is further augmented by adding an installation stub that the customer can start (the original setup file having been wrapped).

The resulting file is a downloadable binary file (a BOB), shown in FIG. 5. The setup file is securely wrapped. Distribution information has been added external to the setup file, and an installation stub has been added to run the original setup file and to put the distribution information into its "correct" place. In Try/Buy, trial condition and parameters are included within the distribution rule set. When the program to be tried or purchased runs, it must have access to the distribution rule set. Therefore, the installation stub, besides running the original setup file, places the distribution rule set into a location where the program, once it has been installed, can find it.

When the software publisher has finished with the BOB, the BOB may then be passed along to a channel partner and, optionally, from channel partner to channel partner through any number of tiers of the multi-tier distribution network as described previously, each channel partner using a tier-specific privilege file (which is password protected) to add to the distribution rule set information within its privilege level.

The distribution rule set for Try/Buy may contain information as shown in Table 2. As compared to the Buy/Try case, a EUTA (End-User Trial Agreement) and conditions of use additionally appear.

TABLE 2

| Party | Inputs to License File |
| --- | --- |
| Tool Vendor | Secured password structure |
| Publisher | Publisher ID |
|  | Product identifier |
|  | End User Trial Agreement (EUTA) |
|  | End User License Agreement (EULA) |
|  | Conditions (i.e., number of uses, trial period length, etc.)--bounds and current |
| Distributor | Distributor ID |
|  | Clearinghouse key (for confidentiality between customer and clearinghouse) |
|  | Clearinghouse comm. parameters |
|  | Product unlock verification key |
| Merchant | Merchant ID |
|  | Product price |
|  | Merchant's clearinghouse account |

When the customer installs the end-user installable package, the installation stub is run. The job of the installation stub is to install the distribution rule set (which the original setup file knows nothing about) and run the original setup file. First, the installation stub calculates a cryptographic "fingerprint" of the wrapped original setup file and checks it against a fingerprint stored in the distribution rule set. If the two fingerprints do not match, the installation stub will display an error. This step prevents "forgery" of a distribution rule set that would allow for unauthorized use.

When the original setup file has been installed and an attempt is made to use the software product, the injected code will read the distribution rule set and disallow use unless the use is within the terms specified.

The foregoing secondary setup process may be further understood with reference to FIG. 6 and FIG. 7. Referring first to FIG. 6, program files to be distributed to the end user include a wrapped program executable (wrapped using the present wrapper tool) and other files used by the program. Using a setup tool of the software publisher's choosing, these files are compressed and packed into a single file. The installation file set produced by the setup tool, besides the foregoing compressed file, may also produce additional files, including a setup rule set (specifying where files are to be placed, what icons are to be added, etc.) and a setup executable file. The installation file set may in turn be encrypted and packed into a single file. A distribution file set includes this encrypted file and a further distribution rule set. Prior to distribution to the end user, the distribution file set is combined into a single end-user installable product (user-installable EXE), during the course of which an install stub is added.

Referring to FIG. 7, during installation, first the install stub copies the distribution rule set into the system directory of the user machine. Then the install stub copies the secured installation file set into a temporary directory, decrypts and unpacks the installation file set, and runs the original setup executable, SETUP.EXE. The original setup executable uncompresses and copies the program files to an end-user-selected product directory. Finally, the wrapper added to the original executable program, PROGRAM.EXE, reads the distribution rule set. Use of the program may then occur consistent with the rules contained in the distribution rule set.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed:

1. A method of distributing a software product using vendor-provided software tools, comprising the steps of:

a software publisher securing a software product using a digital wrapper to control execution of the software product, producing a secured software product;

using a setup tool of its own choosing, the software publisher producing an installation file set, comprising one or more files, to install the secured software product;

the software publisher, using a vendor-provided tool, producing distribution instructions for delivery to an end user, the distribution instructions being of a form that can be modified only by authorized channel partners and subsequently inspected and modified by the wrapper as an end user executes the software;

subsequently placing the installation file set and the distribution instructions in the possession of one or more channel partners, each of said channel partners in turn, using a vendor-provided tool, augmenting the distribution instructions, subject to privileges afforded them; and prior to placing the software product in the possession of an end user, the software publisher or a channel partner packaging the installation file set and the distribution instructions into an end-user installable package.

2. The method of claim 1, wherein software distribution follows a Buy/Try model, and the step of producing a secure software product comprises the software publisher first producing an installation file set using said setup tool and then securing an installation program in the installation file set.

3. The method of claim 1, wherein said packaging of the installation file set and distribution instructions into an end-user installable package occurs prior to channel partners augmenting the distribution instructions.

4. The method of claim 1, comprising the further step of the software publisher packaging the installation file set into a form that is safe from tampering and infection by computer viruses.

5. The method of claim 4, wherein said distribution instructions are secured by a combination of encryption and privileges, such that altering the distribution instructions requires a privilege file.

6. The method of claim 5, wherein a privilege level of the software publisher allows it to unalterably fix at least a portion of the distribution instructions.

7. The method of claim 6, wherein a privilege level of a channel partner allows it to alter a portion of the distribution instructions not unalterably fixed by the software publisher.

8. The method of claim 7, wherein the channel partners include a first-tier channel partner and a second-tier channel partner, wherein distribution instructions altered by a channel partner of a given tier cannot be altered by another channel partner of the same tier.

9. The method of claim 8, wherein the first-tier channel partner is a distributor and the second-tier channel partner is a merchant.

10. The method of claim 1, wherein software distribution follows a Try/Buy model.

* * * * *